(12) United States Patent
Neumann

(10) Patent No.: US 8,410,458 B2
(45) Date of Patent: Apr. 2, 2013

(54) OPTICAL FILTER MATERIAL MADE OF GALLIUM-DOPED QUARTZ GLASS, FILTER COMPONENT AND METHOD FOR IRRADIATION BY MEANS OF A UV RADIATION SOURCE

(75) Inventor: Christian Neumann, Hungen (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 4 days.

(21) Appl. No.: 13/262,298

(22) PCT Filed: Mar. 11, 2010

(86) PCT No.: PCT/EP2010/053076
§ 371 (c)(1),
(2), (4) Date: Nov. 4, 2011

(87) PCT Pub. No.: WO2010/112311
PCT Pub. Date: Oct. 7, 2010

(65) Prior Publication Data
US 2012/0056106 A1  Mar. 8, 2012

(30) Foreign Application Priority Data
Mar. 31, 2009 (DE) .................. 10 2009 015 076

(51) Int. Cl.
*G21K 5/00* (2006.01)
(52) U.S. Cl. .................. 250/492.1; 422/22; 422/24

(58) Field of Classification Search ................ 422/4, 22, 422/24, 28; 250/492.1
See application file for complete search history.

(56) References Cited

U.S. PATENT DOCUMENTS 6,136,736 A     10/2000  Rajaram et al.
2003/0114292 A1  6/2003  Kolberg et al.
2008/0131794 A1  6/2008  Bookbinder et al.

FOREIGN PATENT DOCUMENTS

DE  10 2007 057 486 A1   7/2008
EP    0 483 477 A1        5/1992

OTHER PUBLICATIONS

Ji et al., Gallium oxide films for filter and solar-blind UV detector, Optical Materials, vol. 28, pp. 415 to 417 (2006).
Espacenet English-language abstract for EP 0483477 A1, May 6, 1992.
Espacenet English-language abstract for DE 122007057486 A1, Jul. 10, 2008.

*Primary Examiner* — Sean E Conley
(74) *Attorney, Agent, or Firm* — Tiajoloff & Kelly LLP

(57) ABSTRACT

The invention relates to an optical filter material made of doped quartz glass, which at a low dopant concentration exhibits spectral transmission as high as possible of at least 80% $cm^{-1}$ for operating radiation of 254 nm, transmission as low as possible in the wave range below approximately 250 nm, and an edge wavelength $\lambda_c$ within the wave range of 230 to 250 nm. It was found that this aim is achieved by doping comprising a gallium compound, which in the wave range below 250 nm has a maximum of an absorption band and thus determines the edge wave range $\lambda_c$.

22 Claims, 1 Drawing Sheet

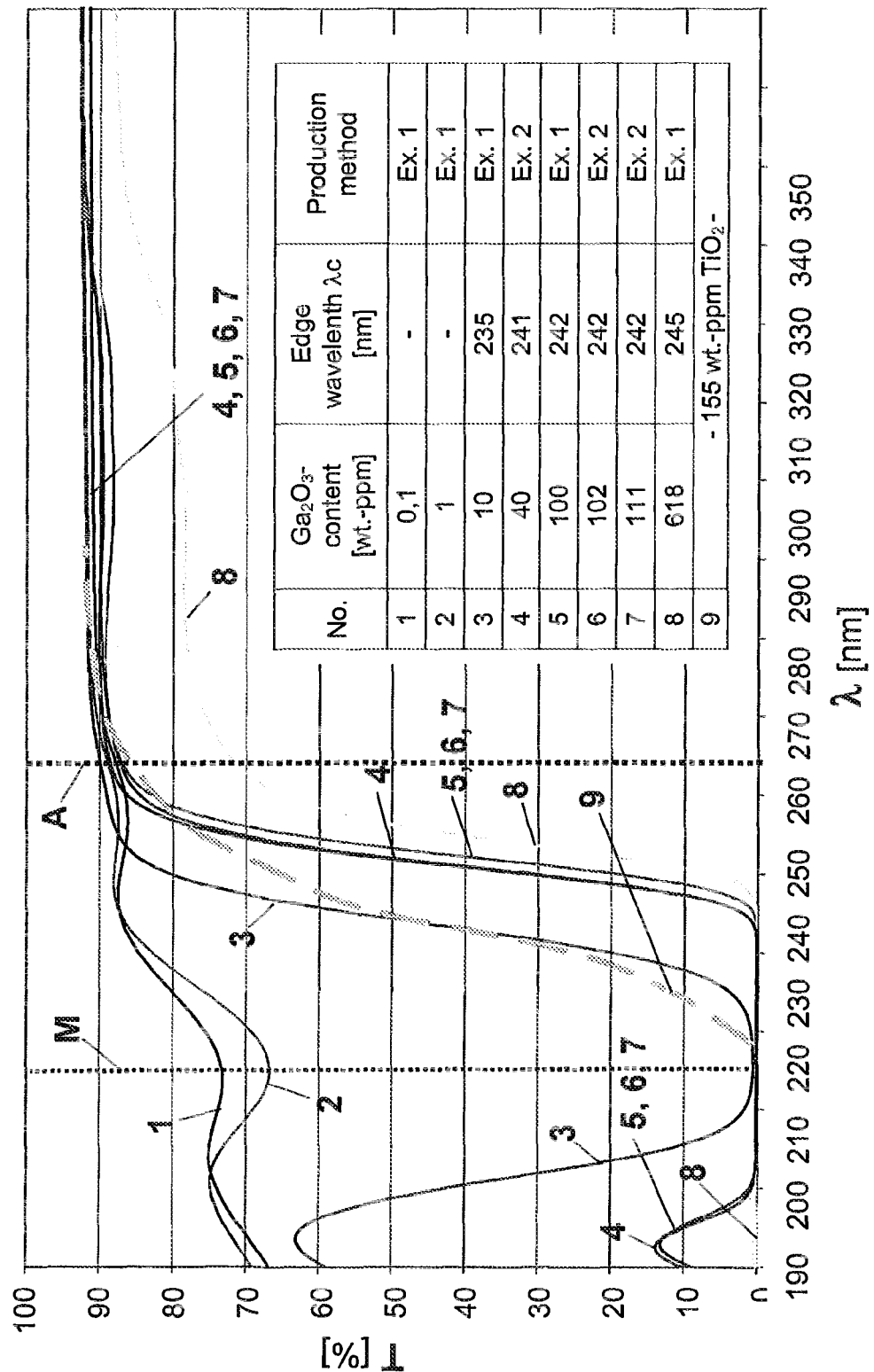

OPTICAL FILTER MATERIAL MADE OF GALLIUM-DOPED QUARTZ GLASS, FILTER COMPONENT AND METHOD FOR IRRADIATION BY MEANS OF A UV RADIATION SOURCE

The present invention relates to an optical filter material made of doped quartz glass, which for UV operating radiation of a wavelength of 254 nm exhibits a spectral transmission of at least 80% cm$^{-1}$ and has an edge wavelength $\lambda_c$ in the wavelength range of 230 nm to 250 nm.

Furthermore, the present invention relates to a method for irradiating a surface, a liquid or a gas by means of a UV radiation source that emits operating radiation of a wavelength around 254 nm and passes through a filter material of doped quartz glass that for the operating radiation exhibits a spectral transmission of at least 80% cm$^{-1}$ and has a wavelength $\lambda_c$ in the wavelength range of 230 nm to 250 nm.

Moreover, the present invention also relates to an optical component consisting of the filter material.

PRIOR ART

Pure quartz glass is transparent to UV radiation in the wavelength range up and into the UVC-VUV range and is therefore preferably used as a lamp material for UV light sources. Apart from the UV operating radiation, such lamps often emit a portion of shorter-wave ultraviolet radiation that leads to the formation of ozone and can be detrimental to health or induce nearby components to age, particularly components made of plastics.

An additional challenge in this respect is presented by applications where UV radiation is used for sterilizing food, surfaces and particularly liquids. Shortwave UV radiation is here used promoting the photolytic formation of noxious nitrites from nitrate that is present in the medium to be sterilized. With a decreasing wavelength (starting from about 270 nm) the nitride formation increases approximately linearly. For water sterilization, mercury vapor lamps are often used having an operating radiation at a wavelength of 254 nm, such lamps also exhibiting an emission line in the UVC-VUV wavelength range around 135 nm. The UV wavelength range below the operating radiation proper is particularly conducive to the formation of nitride.

Undesired portions of the UV radiation in the emission spectrum must therefore be eliminated, if possible. A filter effect with a stop band for UV radiation below 250 nm can be created by doping the quartz glass with a UV radiation-absorbing substance. Titanium dioxide, which as a dopant in quartz glass generates an absorption band with an absorption maximum at about 200 nm, has turned out to be a suitable substance in this sense. At a titanium content of 155 wt. ppm (and an irradiated layer thickness of 0.5 cm) the inner transmission of this filter material is about 90% for the operating wavelength of 254 nm, and the edge wavelength is around 235 nm as shown by curve 9 of FIG. 1). The edge wavelength corresponds to the wavelength at which the spectral pure transmission factor between stop band and pass band is half the maximum value.

The adsorption of the Ti-doped quartz glass, however, decreases considerably up to the operating wavelength of 254 nm, so that high concentrations of titanium dioxide are needed on the one hand for achieving a significant absorption in this wavelength range, and a distinct flattening of the absorption edge towards the longer-wave side occurs on the other hand, which flattening reduces the transmission in the range of the operating wavelength.

Moreover, a high dopant concentration may effect undesired changes in the quartz glass properties; it can particularly change the viscosity and the coefficient of thermal expansion of quartz glass, increase its tendency to crystallization and reduce the radiation resistance to UV radiation, which is particularly disadvantageous above all in quartz glass for UV lamps. The reason for this is that UV radiation damage leads to a gradual decrease in UV transmission (aging) and thus to a decreasing and non-reproducible UVC emission.

US 2003/0114292 A1 discloses a filter material consisting of a multi-component glass with a SiO$_2$ portion of 50 to 62%. The following ranges are specified for the composition: SiO$_2$: 50-62; K$_2$O: 10-25; Na$_2$O: 0-14; Al$_2$O$_3$: 0-2; B$_2$O$_3$: 3-5; ZnO: 13.5-37; F: 0-1; TiO$_2$: 0-7; In$_2$O$_3$: 0-2; Ga$_2$O$_3$: 0-2; SO$_3$: 0-1; SeO$_2$: 0-1; C: 0-1. Different glasses from this range of composition are characterized on the basis of their edge wavelengths, with 324 nm being indicated as the shortest wavelength.

The known filter material is impermeable to ultraviolet radiation throughout the wavelength range of the far UV and is thus not suited for use with UV operating radiation from this wavelength range.

TECHNICAL OBJECT

It is therefore the object of the present invention to indicate a filter material made of doped quartz glass that shows maximum transparency, if possible, for operating radiation of 254 nm and at a low dopant concentration shows minimum transparency, if possible, in the wavelength range below about 250 nm.

Furthermore, it is the object of the present invention to indicate a method which ensures an effective irradiation of a surface, a liquid or a gas by means of UV radiation of a wavelength around 254 nm with a UVC emission that is as constant as possible, and in the case of which the ozone formation is as low as possible at the same time.

As for the filter material, this object starting from a feature of the aforementioned type is achieved according to the invention in that the position of the edge wavelength $\lambda_c$ is determined by doping comprising a gallium compound which in the wavelength range below 250 nm has a maximal absorption band.

It has been found that quartz glass doped with gallium oxide absorbs UV radiation, the UV absorption at a wavelength around 215 nm showing a relative or absolute maximum. Hence, this absorption maximum is closer to the operating wavelength of 254 nm than in the known quartz glass doped with titanium oxide. As a consequence, the transmission curve of a quartz glass doped with gallium oxide as compared with quartz glass doped with titanium oxide shows a steeper flank of the absorption band towards the longer-wave side, so that the absorption at wavelengths around 250 nm is comparatively low and high transparency can be achieved at the operating wavelength of a low-pressure mercury vapor discharge lamp of 254 nm.

Thus the gallium compound defines the position of the edge wavelength $\lambda_c$. This means that a different wavelength would be obtained for $\lambda_c$ if the quartz glass was not doped with the gallium compound. The edge wavelength is in the range of 230 nm to 250 nm, preferably at 235 nm to 245 nm. The data on the edge wavelength refer to an irradiated material layer thickness of 0.5 cm.

The UV absorption of gallium oxide is higher than that of titanium oxide in at least a portion of the wavelength range of 150 nm to 250 nm at the same dopant concentration. Hence, at a comparatively low dopant concentration one obtains a high absorption in this wavelength range.

The optical filter material according to the invention is normally present as a component or as a layer on a component. The component is e.g. a tube, a plate, a disc or a lens.

It must be expected that also other gallium compounds that are chemically similar to gallium oxide ($Ga_2O_3$), e.g. gallium halides or gallium nitride (GaN), have the above-explained UV absorbing effect. Preferably, however, the gallium compound is gallium oxide.

Gallium oxide is thermally and chemically stable and does not tend to form bubbles in quartz glass.

Concentrations of the gallium compound (Ga concentration based on the undoped quartz glass) which are in the range of 1 wt. ppm to 1000 wt. ppm, preferably in the range of 50 wt. ppm to 500 wt. ppm, have turned out to be particularly suited.

Absorption depends on the concentration of the gallium compound and the irradiated layer thickness of the filter material. At a small layer thickness, e.g. in the case of layers which are applied by vapor deposition or sputtering and have thicknesses in the μm range, comparatively high concentrations of the gallium compound are needed for achieving any significant absorption, and low concentrations at a great layer thickness.

If an almost complete absorption of shortwave UV radiation in the wavelength range around 215 nm is to be achieved, concentrations in the above-mentioned range are preferred if the layer thicknesses are in the range of about 0.5 mm to 5 mm, as is typical of tube- or plate-shaped components in lamp applications. At Ga concentrations of less than 1 wt. ppm, the UV absorption will be relatively low, especially at wavelengths below 200 nm, whereas at a Ga concentration of more than 1000 wt. ppm a significant absorption can be noticed in the range of the operating wavelength of 254 nm. The concentration range of 50 wt. ppm to 500 wt. ppm is a particularly suited compromise with which an almost constant high absorption in the wavelength range of 150 nm to about 240 nm can also be achieved without any further dopant. Low dopant concentrations are here concerned that have only a slight impact on the chemical and thermal properties of the quartz glass and on the UV radiation resistance thereof.

On the other hand, at a wavelength of about 195 nm gallium oxide in quartz glass shows a slightly increased transmission in comparison with the neighboring wavelength ranges. To close the slightly translucent window also in this wavelength range, it has turned out to be advantageous when doping comprises a titanium compound in addition, preferably a titanium compound in the form of titanium oxide.

Titanium oxide shows a particularly high absorption for UV radiation of a wavelength below about 215 nm, but also has an impact on transparency in the range of the operating wavelength. Due to Co doping with gallium oxide comparatively small amounts of titanium oxide are enough to compensate the relative absorption minimum of gallium oxide in the shortwave range. Therefore, on the whole, relatively low concentrations of both gallium oxide and titanium oxide are needed for the complete absorption of the shortwave UV radiation, so that the transmission in the range of the operating wavelength remains high and the other properties of the quartz glass are also not significantly impaired by doping.

With regard to this, particular preference is given to an embodiment of the filter material according to the invention, wherein the concentration of the titanium compound ($TiO_2$ concentration based on the undoped quartz glass) is in the range of 1-50 wt. ppm, and preferably less than 20 wt. ppm.

To minimize impairment of the chemical and physical properties of the quartz glass, such as viscosity, thermal expansion coefficient and chemical resistance, by doping, the concentration thereof is kept as low as possible. This is facilitated by additional titanium dioxide doping in the aforementioned range.

In this context it has turned out to be particularly useful when doping comprises gallium oxide ($Ga_2O_3$) and titanium oxide ($TiO_2$), wherein the mol ratio of Ga:Ti is in the range of 10 to 100.

Mixed doping made up of gallium oxide and titanium oxide with a higher amount of gallium oxide is here intended. The gallium oxide amount essentially contributes to an absorption in the wavelength range of 150 nm to about 240 nm, and the titanium oxide amount additionally reduces transmission at a wavelength around 195 nm. At a low dopant concentration this yields a quartz glass with an almost constantly high absorption in the shortwave UV wavelength range. The low dopant concentration has a particularly advantageous effect on the UV radiation resistance of the filter material.

Naturally occurring $SiO_2$ start material for the production of quartz glass often contains a certain amount of $TiO_2$ in the ppm range. When such a start material is used, a suitable mixed doping consisting of gallium oxide and titanium oxide can be obtained also without any additional doping of titanium oxide.

Preferably, the quartz glass of the filter material is a synthetically produced quartz glass.

Synthetically produced quartz glass is distinguished by high transmission in the range of the operating wavelength and by high UV radiation resistance. This may inter alia be due to a low content of oxygen deficiency defects, as may e.g. arise under reducing melting conditions in the case of electrically molten quartz glass.

In this context it turns out to be advantageous when the $SiO_2$ content of the filter material is at least 99.9% by wt.

The high amount of $SiO_2$ in the filter material ensures high transparency for the UV operating radiation and a particularly high UV radiation resistance, especially when the quartz glass consists of synthetically produced $SiO_2$.

Synthetically produced quartz glass, however, often shows a high hydroxyl group content that reduces the thermal deformation resistance of the quartz glass. To mitigate this drawback, the filter material according to the invention is preferably characterized in that the quartz glass has a hydroxyl group content of less than 10 wt. ppm, preferably less than 1 wt. ppm.

The filter material according to the invention reduces the shortwave UV portion, thereby avoiding the formation of ozone. It is particularly suited for the manufacture of lamp material for UV discharge lamps, e.g. as a lamp tube or cladding tube for surrounding lamps. It is however also suited as a lens material, for instance for microlithographic exposure devices.

As for the radiation method, the above-mentioned object, starting from a radiation method of the aforementioned type, is achieved according to the invention in that a filter material is used in which the position of the edge wavelength is determined by doping comprising a gallium compound that in the wavelength range below 250 nm has a maximum of an absorption band.

Quartz glass doped with gallium oxide shows pronounced and steep absorption at a wavelength around 215 nm with hardly any effect on absorption at the operating wavelength of 254 nm and therefore permits an efficient UV radiation by means of a low-pressure mercury vapor discharge lamp at the operating wavelength of 254.

The method according to the invention permits an efficient irradiation of foodstuff, air and technical products, ensuring a substantial time constancy of the emission of the UV operating radiation of the wavelength around 254 nm due to the high radiation resistance of the glass.

The position of the edge wavelength $\lambda_c$ is here defined by the gallium compound. This means that without doping a different wavelength would result for $\lambda_c$.

The concentration of the gallium compound (Ga concentration based on the undoped quartz glass) is in the range of 1-1000 wt. ppm, preferably in the range of 50-500 wt. ppm. This is a comparatively low dopant concentration that has only a minor impact on the chemical and thermal properties of the quartz glass and on the UV radiation resistance thereof.

The method according to the invention can preferably be carried out using the filter material according to the invention. Thus advantageous configurations of the method also follow from the sub-claims regarding the filter material of the invention. In this respect reference is made to the above explanations on the preferred embodiments regarding the filter material.

As for the optical filter component, the above-indicated object is achieved according to the invention in that it consists of a filter material according to the invention and has a spectral transmission of at least 80% $cm^{-1}$ and an edge wavelength $\lambda_c$ in the wavelength range of 230 nm to 250 nm for UV operating radiation of a wavelength of 254 nm.

The filter material according to the invention is characterized by spectral transmission which on the one hand permits an efficient irradiation in the wavelength range around 254 nm and on the other hand substantially absorbs UV radiation with wavelengths of <250 nm. This is achieved through the position of the edge wavelength $\lambda_c$ and the steepness of the absorption flank that follows from doping the quartz glass with gallium. In this respect reference is made to the above explanations regarding the filter material according to the invention, which are equally applicable to the filter component according to the invention.

The optical filter component is e.g. present as a tube, plate or lens. Typical layer thicknesses of the component are in the range of 1 mm to 5 mm.

EMBODIMENT

The invention shall now be explained in more detail with reference to embodiments and a drawing, in which FIG. 1 shows a diagram with transmission curves of optical filter materials according to the invention as compared with a titanium oxide-doped quartz glass according to the prior art.

The optical filter material according to the invention can be produced by means of the standard methods used for producing doped quartz glass. Slip methods, sol-gel methods or CVD methods using vaporizable starting compounds, such as $GaCl_3$, should be mentioned as examples. In this respect reference is also made to the methods used for doping quartz glass with the chemically similar dopant $Al_2O_3$. Other preferred examples of producing the optical filter material according to the invention shall be explained hereinafter:

Example 1

Commercial $SiO_2$ granules which consist of synthetically produced, spherical, dense $SiO_2$ particles are used as the start material. The $SiO_2$ particles have a multimodal particle size distribution with a relatively narrow maximum of the size distribution at about 30 μm ($D_{50}$ value) and with a secondary maximum in the range around 2 μm. The start material is purified by hot chlorination at a high temperature (about 1050° C.).

10 kg of these $SiO_2$ granules are homogeneously mixed with 10 g $Ga_2O_3$ (1000 wt. ppm $Ga_2O_3$, the Ga concentration being based on the undoped quartz glass) by means of a ball mill with a wall and with grinding bodies consisting of quartz glass. Further $SiO_2$ granules are added to this basic mixture, so that after renewed homogenization powder mixtures will be obtained with the following nominal dopant concentrations (Ga in wt. ppm, Ga concentration based on the undoped quartz glass): 0.1/1.0/10/100/618.

The powder mixtures are each time put into a hollow cylindrical graphite mold and vitrified in a sintering furnace by gas pressure sintering. The graphite mold is first slowly heated up to 1100° C. During a first phase lasting for nine hours, which includes heating-up and the first three hours of the holding time at this temperature, a vacuum (<5 mbar) is maintained in the sintering furnace, interrupted by inert-gas purging processes. During a subsequent second phase a nitrogen overpressure of 12 bar is produced and, interrupted by a gas exchange of the furnace atmosphere, maintained for a total of twelve hours before the furnace temperature is increased under vacuum to 1550° C. At this temperature the powder mixture is sintered for a duration of 2.5 h and under vacuum and then heated to a temperature of 1700° C. and vitrified in this process into a block of transparent quartz glass with a hydroxyl group content of less than 1 wt. ppm. Due to this manufacturing method the quartz glasses are molten under slightly reducing conditions in a hydrogen-free atmosphere.

This yields blocks of Ga-containing quartz glass that are subjected to a transmission measurement in the wavelength range of 190 nm to 350 nm. The results of these measurements are shown in FIG. 1 and will be further explained hereinafter.

Example 2

11.1 g metallic gallium is dissolved in a $HNO_3$ solution. 100 kg purified $SiO_2$ granules (as described in Example 1) are homogeneously mixed with the Ga-containing $HNO_3$ solution. A gallium-containing solid which evenly covers the $SiO_2$ granules is obtained by removing the solvent. Subsequent oxidation yields gallium oxide in an amount corresponding to a weight fraction of 111 wt. ppm of gallium (Ga concentration based on the undoped quartz glass). Further doped quartz glass granules with nominal dopant concentrations of gallium of 40 wt. ppm and 102 wt. ppm are produced in a corresponding way.

The doped $SiO_2$ granules are each time fused in an electric-arc rotation method at temperatures of more than 2000° C. in pure argon atmosphere, so that a hollow cylinder of quartz glass with an inner diameter of 150 mm is produced. After mechanical treatment one obtains a so-called mother tube which is elongated into a lamp tube according to a standard tool-free drawing process. The resulting tube consists of quartz glass having a nominal Ga content of 111 wt. ppm. The quartz glass doped in this way exhibits the transmission curve explained in more detail further below with reference to FIG. 1 and is e.g. suited for halide lamps and discharge lamps. In this manufacturing method the quartz glasses are also molten under slightly reducing conditions in a hydrogen-free atmosphere.

Example 3

10 g metallic gallium and 0.5 g metallic titanium are dissolved in $HNO_3$. 100 kg purified $SiO_2$ granules (as described in Example 2) are homogeneously mixed with the Ga- and Ti-containing $HNO_3$ solution. A gallium- and titanium-containing compound which evenly covers the $SiO_2$ granules is obtained by removing the solvent. Subsequent oxidation yields gallium oxide and titanium oxide with a weight portion corresponding approximately to 100 wt. ppm of gallium and 5 wt. ppm of titanium (Ga concentration based on the undoped quartz glass each time). A quartz glass doped with gallium oxide and titanium oxide is produced from the coated $SiO_2$ granules on the basis of the method described in Example 2.

FIG. 1 shows the transmission curves 1-8 of the doped quartz glasses, the production of which has been described with reference to Examples 1 and 2. The diagram shows the measured transmission (in %) at a sample thickness of 5 mm over the wavelength range of 190 nm to 350 nm. The associated table indicates the composition, the production method and the respective edge wavelength.

Moreover, by comparison, the transmission curve 9 of a commercial quartz glass doped with 155 wt. ppm titanium oxide is plotted (based on undoped quartz glass).

It is evident that doping with gallium oxide produces absorption with a maximum "M" at a wavelength around 215 nm. With an increasing dopant concentration the absorption maximum becomes larger. At a gallium concentration of 10 wt. ppm (curve 3) a transmission is no longer measured at the given sample thickness in the area of the absorption maximum.

At a gallium concentration in the range of from 40 wt. ppm to 102 wt. ppm (curves 4-7), the range of the zero transmission broadens to wavelengths of 200 nm to about 235 nm. It is noteworthy that the flank of the absorption maximum towards the longer-wave side is relatively steep; at any rate it is clearly steeper than the corresponding flank of the absorption maximum in the case of the titanium oxide-doped quartz glass according to curve 9. In the short-wave range one still obtains a small transmission window at wavelengths below 200 nm in the case of these dopant concentrations.

As shown by transmission curve 8, the transmission window is closed at wavelengths below 200 nm in the case of a Ga concentration of 618 wt. ppm (based on the undoped quartz glass). Although the completely blocked wavelength range can thus be broadened by further increasing the gallium oxide concentration, the Ga concentration raised to 618 wt ppm also leads to a flatter flank of the absorption maximum and thus to a reduction of the transmission in the range of the operating wavelength "A". In the preferred quartz-glass doping processes according to samples 3 to 7 a spectral transmission of more than 85% is achieved in the range of the operating wavelength of 254 nm.

The quartz glass with the composition of sample 5 is used for producing the lamp bulb of a mercury low-pressure lamp that has a nominal power of 10 W (at a nominal lamp current of 425 mA), a radiator length of 20 cm and thus a power density of about 0.5 W/cm. The lamp bulb consists of a tube of the doped quartz glass that is closed at its ends with pinches through which electrical connections are guided to the helical electrode.

For sterilizing drinking water it is inserted into a closed cladding tube around which the drinking water to be sterilized flows.

The mercury low-pressure lamp emits UVC radiation with an emission maximum around 184 nm and a further maximum at 254 nm. The Ga-doped quartz glass acts for the emission spectrum of the lamp as an edge filter for the short-wave portion of the UVC radiation. The spectral transmission at the wavelength of 254 nm is 87% and is 0% at 230 nm. The edge wavelength $\lambda_c$ is about 242 nm.

Ozone formation is thus comparatively low. Due to the low dopant concentration the quartz glass shows a high UV radiation resistance, so that there will no significant aging during operation.

The invention claimed is:

1. An optical filter material comprising doped quartz glass, which for UV operating radiation of a wavelength of 254 nm exhibits a spectral transmission of at least 80% $cm^{-1}$ and has an edge wavelength $\lambda_c$ in a wavelength range of 230 nm to 250 nm, wherein the edge wavelength $\lambda_c$ is produced by doping with a gallium compound that has a maximum of an absorption band in a wavelength range below 250 mm.

2. The filter material according to claim 1, wherein the gallium compound is $Ga_2O_3$.

3. The filter material according to claim 1, wherein the gallium compound is present with a Ga concentration based on the undoped quartz glass that is in a range of 1 to 1000 wt. ppm.

4. The filter material according to claim 3, wherein the gallium compound is present with said Ga concentration based on the undoped quartz glass in a range of 50 to 500 wt. ppm.

5. The filter material according to claim 1, wherein the dopant comprises a titanium compound.

6. The filter material according to claim 5, wherein the titanium compound is present with a Ti concentration based on the undoped quartz glass that is in a range of 1 to 50 wt. ppm.

7. The filter material according to claim 6, wherein the titanium compound is present with the Ti concentration based on the undoped quartz glass less than 20 wt. ppm.

8. The filter material according to claim 1, wherein said doping comprises gallium oxide ($Ga_2O_3$) and titanium oxide ($TiO_2$), the mol ratio of Ga:Ti being in a range of 10 to 100.

9. The filter material according to claim 1, wherein the quartz glass is synthetically produced silica.

10. The filter material according to claim 1, wherein the quartz glass has an $SiO_2$ content that is at least 99.9%.

11. The filter material according to claim 1, wherein the quartz glass has a hydroxyl group content of less than 10 wt. ppm.

12. A method for irradiating a surface, a liquid or a gas comprising:
providing a UV radiation source that emits operating radiation of a wavelength around 254 nm, and causing said operating radiation to pass which passes through a filter material of doped quartz glass that for the operating radiation exhibits a spectral transmission of at least 80% $cm^{-1}$ and has an edge wavelength $\lambda_c$ in a wavelength range of 230 nm to 250 nm, wherein the edge wavelength $\lambda_c$ is produced by doping comprising a gallium compound that has an absorption band with a maximum in a wavelength range below 250 nm.

13. An optical filter component made of a filter material according to claim 1, wherein for UV operating radiation of a wavelength of 254 nm said optical filter component exhibits a spectral transmission of at least 80% $cm^{-1}$ and has an edge wavelength $\lambda_c$ in the wavelength range of 230 to 250 nm.

14. The filter material according to claim 1 wherein the dopant comprises a titanium compound in the form of $TiO_2$.

15. The filter material according to claim 1, wherein the quartz glass has a hydroxyl group content of less than 1 wt. ppm.

16. The optical filter component according to claim 13, wherein the edge wavelength $\lambda_c$ is produced by doping the filter material with a dopant, said dopant comprises a gallium compound that has a maximum of an absorption band in a wavelength range below 250 mm.

17. The optical filter component according to claim 13, wherein the gallium compound is $Ga_2O_3$, which is present with a Ga concentration based on the undoped quartz glass that is in a range of 1 to 1000 wt. ppm.

18. The optical filter component according to claim 17, wherein the gallium compound is present with a Ga concentration based on the undoped quartz glass that is in a range of 50 to 500 wt. ppm.

19. The optical filter component according to claim 16, wherein the dopant comprises a titanium compound, which is present with a Ti concentration based on the undoped quartz glass that is in the range of 1 to 50 wt. ppm.

20. The optical filter component according to claim 16, wherein the dopant comprises gallium oxide ($Ga_2O_3$) and titanium oxide ($TiO_2$), the mol ratio of Ga:Ti being in the range of 10 to 100.

21. The optical filter component according to claim 13, wherein the filter material is made of quartz glass that is synthetically produced silica and wherein the $SiO_2$ content of said optical filter material is at least 99.9%.

22. The optical filter component according to claim 21, wherein the quartz glass has a hydroxyl group content of less than 10 wt. ppm., preferably less than 1 wt. ppm.

* * * * *